US010742712B2

(12) United States Patent
Wisgo

(10) Patent No.: US 10,742,712 B2
(45) Date of Patent: Aug. 11, 2020

(54) WEB ADAPTATION AND HOOKING FOR VIRTUAL PRIVATE INTEGRATION SYSTEMS AND METHODS

(71) Applicant: Citrix Systems, Inc., Fort Lauderdale, FL (US)

(72) Inventor: Jeffrey David Wisgo, Portland, OR (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 95 days.

(21) Appl. No.: 16/175,225

(22) Filed: Oct. 30, 2018

(65) Prior Publication Data

US 2020/0137139 A1 Apr. 30, 2020

(51) Int. Cl.
*G06F 15/177* (2006.01)
*H04L 29/08* (2006.01)
*H04L 12/46* (2006.01)

(52) U.S. Cl.
CPC ........ *H04L 67/025* (2013.01); *H04L 12/4633* (2013.01); *H04L 12/4641* (2013.01); *H04L 67/146* (2013.01); *H04L 69/329* (2013.01)

(58) Field of Classification Search
CPC ............... H04L 12/4633; H04L 67/025; H04L 12/4641; H04L 69/329; H04L 67/146
See application file for complete search history.

(56) References Cited

U.S. PATENT DOCUMENTS

| 9,009,813 | B2 | 4/2015 | Agarwal et al. | |
| 2002/0042830 | A1* | 4/2002 | Bose | H04L 29/06 709/230 |
| 2002/0065912 | A1* | 5/2002 | Catchpole | H04L 29/06 709/224 |
| 2003/0014541 | A1* | 1/2003 | Poeluev | H04L 12/4641 709/245 |
| 2004/0143669 | A1* | 7/2004 | Zhao | H04L 29/06 709/228 |
| 2006/0104288 | A1* | 5/2006 | Yim | H04L 12/4633 370/395.52 |

(Continued)

OTHER PUBLICATIONS

International Search Report and Written Opinion for International Appl. No. PCT/US2019/055022, dated Dec. 4, 2019, dated Dec. 4, 2019.

*Primary Examiner* — Razu A Miah
(74) *Attorney, Agent, or Firm* — Foley & Lardner LLP

(57) ABSTRACT

Systems and method for web control adaptation and hooking for virtual private network integration are provided herein. A client application executing on a client device can modify a scheme support function of a web control application to return a first value in response to a first scheme type. The first value can indicate that the web control application does not support the first scheme type. A custom scheme function can be registered to handle the first scheme type and can intercept requests of the first scheme type. The custom scheme function can transmit the requests to one or more URLs corresponding to one or more applications through a virtual private network (VPN). The custom scheme function can forward, to the web control application for rendering on the client device, the data corresponding to the application retrieved by the custom scheme function through the VPN.

16 Claims, 4 Drawing Sheets

(56) References Cited

U.S. PATENT DOCUMENTS

| | | | |
|---|---|---|---|
| 2007/0071028 A1* | 3/2007 | Dorris | H04L 12/4633 370/466 |
| 2007/0121617 A1* | 5/2007 | Kanekar | H04L 45/586 370/389 |
| 2007/0168466 A1* | 7/2007 | Tooley | H04L 67/322 709/218 |
| 2008/0256207 A1* | 10/2008 | Doi | H04L 51/34 709/206 |
| 2008/0310319 A1* | 12/2008 | Kitamura | H04L 12/4641 370/252 |
| 2009/0177800 A1* | 7/2009 | Gidron | H04L 67/1095 709/248 |
| 2011/0162062 A1* | 6/2011 | Kumar | G06F 21/10 726/15 |
| 2012/0290732 A1* | 11/2012 | Suganthi | H04L 12/4641 709/228 |
| 2013/0117444 A1* | 5/2013 | Sharma | H04L 67/16 709/224 |
| 2013/0298201 A1* | 11/2013 | Aravindakshan | H04L 63/0272 726/4 |
| 2015/0039773 A1* | 2/2015 | Runeson | H04L 65/1016 709/227 |
| 2015/0113172 A1* | 4/2015 | Johnson | G06Q 10/10 709/245 |
| 2018/0295134 A1 | 10/2018 | Gupta et al. | |

\* cited by examiner

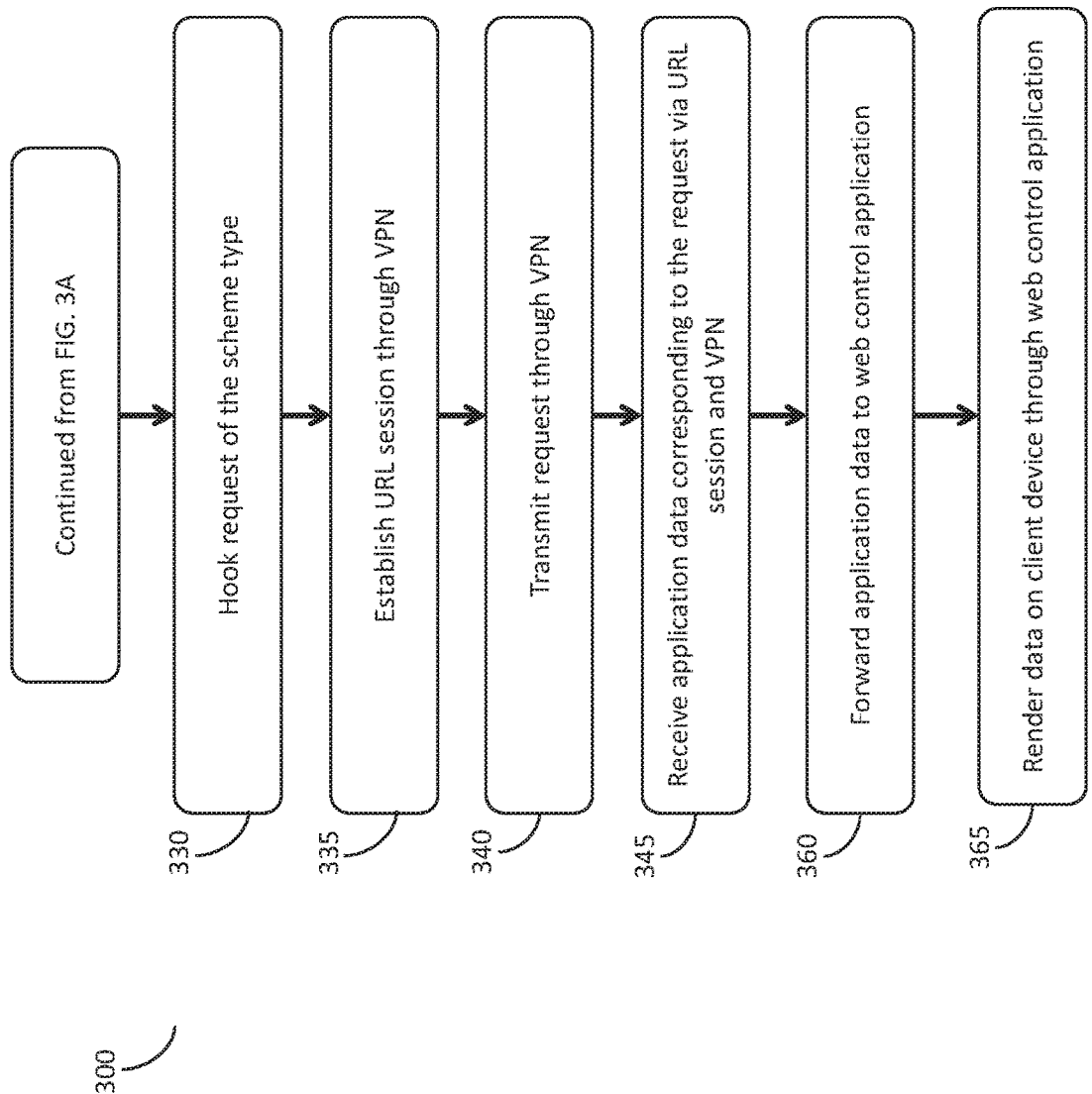

WEB ADAPTATION AND HOOKING FOR VIRTUAL PRIVATE INTEGRATION SYSTEMS AND METHODS

BACKGROUND

Operating systems can provide controls to various applications executing on a computing device regarding the ability to adapt or integrate the different functionalities of the applications. For example, the operating system can include policies that restrict or deny certain functionalities or limit the ability of one or more applications to interact with other applications executing on the computing device. Thus, complete integration between the various applications and systems on the computing device can be restricted or limited.

SUMMARY

Systems and methods for web control adaptation and hooking for virtual private network integration on a client device are provided herein. The systems and methods described herein can provide or modify scheme support functions of a web control application to provide hooking for different scheme types, such as but not limited to, HTTP schemes or HTTPS schemes, that the respective web control application may not have previously permitted to be hooked and integrate the web control application with virtual private network (VPN) logic. For example, intercepting or hooking of requests of a particular scheme type can be performed for a web control application by modifying a functionality of a scheme support function of the web control application to indicate that the web control application does not support the particular scheme type. The requests can be intercepted or hooked by a custom scheme function generated by a client application executing on the client device. The hooked requests can be transmitted from the client device to a corresponding application through a VPN via an encrypted session. Thus, the VPN logic can be integrated with the web control application that previously did not support the VPN logic to provide web control adaptation, hooking and VPN integration for the client device.

In embodiments, a client application executing on a client device can modify a scheme support function of a web control application to return a first value in response to a request of a first scheme type. For example, the scheme support function of the web control application can be modified to return a first value (e.g., false, no) indicating that the web control application does not support the first scheme type. The first scheme type can be registered with the web control application responsive to modifying the scheme support function. For example, the first scheme type can be registered with the web control application such that, in response to a request of the first scheme type, the web control application can allow the handling or processing of requests of the first scheme type to be performed by a custom scheme function. The custom scheme function can be generated by the client application for the first scheme type. For example, the custom scheme function can intercept or hook requests of the first scheme type from the web control application to handle the respective requests.

The custom scheme function can establish a URL session using a URL API through a VPN that the client device is connected to. For example, the custom scheme function can establish an encrypted URL session between the client device and an application hosted by a third party server identified in a request. The custom scheme function can transmit the request to the application and receive application data in response through the encrypted URL session. In some embodiments, the custom scheme function can redirect the request from a main frame URL corresponding to the application to a secondary or otherwise different URL corresponding to the application.

The client application can maintain a URL listing for URLs accessed by the client device and/or custom scheme function. The client application can update the URL listing responsive to a re-direction performed by the custom scheme function. The update can include removing and/or adding one or more URLs to the URL listing responsive to the re-direction. The client application can reload the web control application responsive to updating the URL listing. For example, the client application can reload the web control application such that the web control application identifies or points to the URLs included in the updated URL listing.

The custom scheme function can receive the application data from the corresponding application through the encrypted URL session established within the VPN. Thus, the custom scheme function can provide VPN logic for handling and processing requests of the first scheme type. The custom scheme function can provide the application data retrieved through the encrypted URL session established within the VPN to the web control application. The web control application can render or otherwise provide the application data to the client device. For example, the web control application can execute the requested application using the application data retrieved by the custom scheme function through the VPN. Thus, the client application, using the custom scheme function, can provide web control adaptation and hooking for particular scheme types (e.g., HTTP schemes, HTTPS schemes) for a web control application that may not support the particular scheme type and integrate the web control adaptation and hooking with VPN logic.

In one aspect, this disclosure is directed to a method for web control adaptation and hooking for virtual private network integration. The method can include modifying, by a client application executing on a client device, a scheme support function of a web control application to return a first value in response to a first scheme type. The first value can indicate that the web control application does not support the first scheme type. The method can include registering, by the client application, a custom scheme function to handle the first scheme type for the web control application. The method can include maintaining, by the client application, a uniform resource locator (URL) listing having a plurality of URLs accessed by the client device through the custom scheme function. The method can include intercepting, by the custom scheme function from the web control application, a first request for a first application of a plurality of applications. The first request of the first scheme type, and the first application corresponding to a first URL. The method can include transmitting, by the custom scheme function, the first request to the first URL corresponding to the first application through a virtual private network (VPN). The VPN can be established between the client device and the first server hosting the first application. The method can include forwarding, by the custom scheme function to the web control application for rendering on the client device. The data can correspond to the first application retrieved through the VPN.

In some embodiments, the method can include re-directing, by the custom scheme function, the first request from the first URL to a second URL corresponding to the first application through the VPN. The second URL can be hosted by the first server of the plurality of servers. The method can include adding, by the client application, the second URL to the URL listing responsive to the re-direction. The method can include removing, by the client application, the first URL from the URL listing responsive to the re-direction. In some embodiments, the method can include updating, by the client application, at least one URL of the URL listing responsive to a re-direction of the first request from the first URL and reloading, by the client application, the web control application responsive to updating the URL listing.

The method can include displaying, by the web control application on the client device, the data corresponding to the first application retrieved through the VPN. The method can include establishing, by the custom scheme function, a URL session to the first application through the VPN. The URL session can connect the client device and the first server. In some embodiments, the method can include receiving, by the custom scheme function, data corresponding to the first application. The data received through a URL session established between the client device and the first server via the VPN.

In some embodiments, the method can include establishing, by the client application, a plurality of scheme functions, each of the custom scheme functions corresponding to at least one scheme type. The method can include executing, by the web control application on the client device, the first application using the data corresponding to the first application retrieved through the VPN. The method can include hooking, by the custom scheme function, a plurality of requests from the web control application, each of the plurality of request of the first scheme type. In some embodiments, the method can include establishing, by the custom scheme function, a plurality of URL sessions between the client device and a plurality of servers through the VPN. Each of the plurality of URL sessions can correspond to at least one request of the plurality of requests. Each of the plurality of URL sessions can connect the client device to at least one server of the plurality of servers.

In another aspect, this disclosure is directed to a system for web control adaptation and hooking for virtual private network integration on a client device. The system can include a client application executable on a client device. The client application can be configured to modify a scheme support function of a web control application to return a first value in response to a first scheme type. The first value can indicate that the web control application does not support the first scheme type. The client application can be configured to register a custom scheme function to handle the first scheme type for the web control application. The client application can be configured to maintain a uniform resource locator (URL) listing having a plurality of URLs accessed by the client device through the custom scheme function. The custom scheme function configured to intercept, from the web control application, a first request for a first application of a plurality of applications. The first request can be of the first scheme type. The first application can correspond to a first URL. The custom scheme function can transmit the first request to the first URL corresponding to the first application through a virtual private network (VPN). The VPN can be established between the client device and the first server hosting the first application. The custom scheme function can be configured to forward, to the web control application for rendering on the client device, the data can correspond to the first application retrieved through the VPN.

In some embodiments, the custom scheme function can be further configured to re-direct the first request from the first URL to a second URL corresponding to the first application through the VPN. The second URL can be hosted by the first server of the plurality of servers. The web control application can be further configured to display, on the client device, the data corresponding to the first application retrieved through the VPN. The client application can be further configured to establish a plurality of scheme functions. Each of the custom scheme functions can correspond to at least one scheme type.

The client application can be further configured to update at least one URL for the URL listing responsive to a re-direction of the first request from the first URL and reload the web control application responsive to updating the URL listing. In some embodiments, the web control application can be further configured to execute, on the client device, the first application using the data corresponding to the first application retrieved through the VPN. The custom scheme function can be further configured to hook a plurality of requests from the web application. Each of the plurality of requests can be of the first scheme type. The custom scheme function can be further configured to establish a plurality of URL sessions between the client device and a plurality of servers through the VPN. Each of the plurality of URL sessions can correspond to at least one request of the plurality of requests. Each of the plurality of URL sessions can connect the client device to at least one server of the plurality of servers.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIGS. 3A-3B are a flow diagram of a method for web adaptation and hooking for virtual private network integration.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes embodiments of systems and methods for web adaptation and hooking for virtual private network integration.

A. Computing Environment

Prior to discussing the specifics of embodiments of the systems and methods detailed herein in Section B, it may be helpful to discuss the computing environments in which such embodiments may be deployed.

Figure 1:
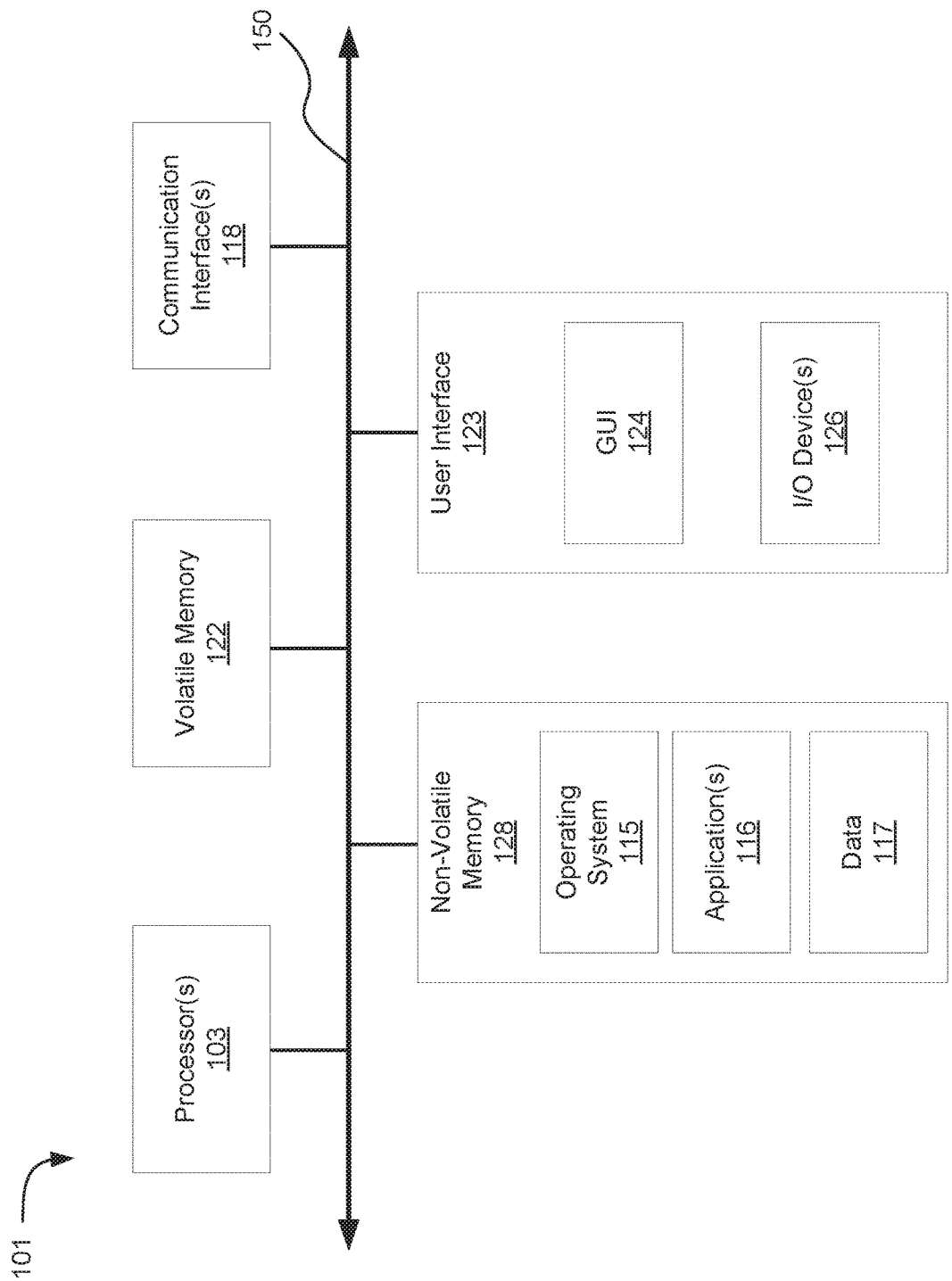
FIG. 1 is a block diagram of embodiments of a computing device.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Web Adaptation and Hooking for Virtual Private Network Integration

The systems and methods described herein can modify scheme support functions of a web control application to provide hooking for different scheme types, such as but not limited to, HTTP schemes or HTTPS schemes, that the respective web control application may not have previously permitted to be hooked and integrate the web control application with virtual private network (VPN) logic. A client application executing on a client device can modify a scheme support function of a web control application to return a first value in response to a request of a first scheme type. For example, intercepting or hooking of requests of a particular scheme type can be performed for the web control application by modifying a functionality of the scheme support function of the web control application to indicate that the web control application does not support the particular scheme type. In some embodiments, the scheme support function of the web control application can be modified to return a first value (e.g., false, no) indicating that the web control application does not support the first scheme type. The requests can be intercepted or hooked by a custom scheme function generated by a client application executing on the client device. The first scheme type can be registered with the web control application responsive to modifying the scheme support function. For example, the first scheme type can be registered with the web control application such that, in response to a request of the first scheme type, the web control application can allow the handling or processing of requests of the first scheme type to be performed by the custom scheme function. The hooked requests can be transmitted from the client device to a corresponding application through a VPN via an encrypted session. Thus, the VPN logic can be integrated with the web control application that previously did not support the VPN logic to provide web control adaptation, hooking and VPN integration for the client device.

Figure 2:
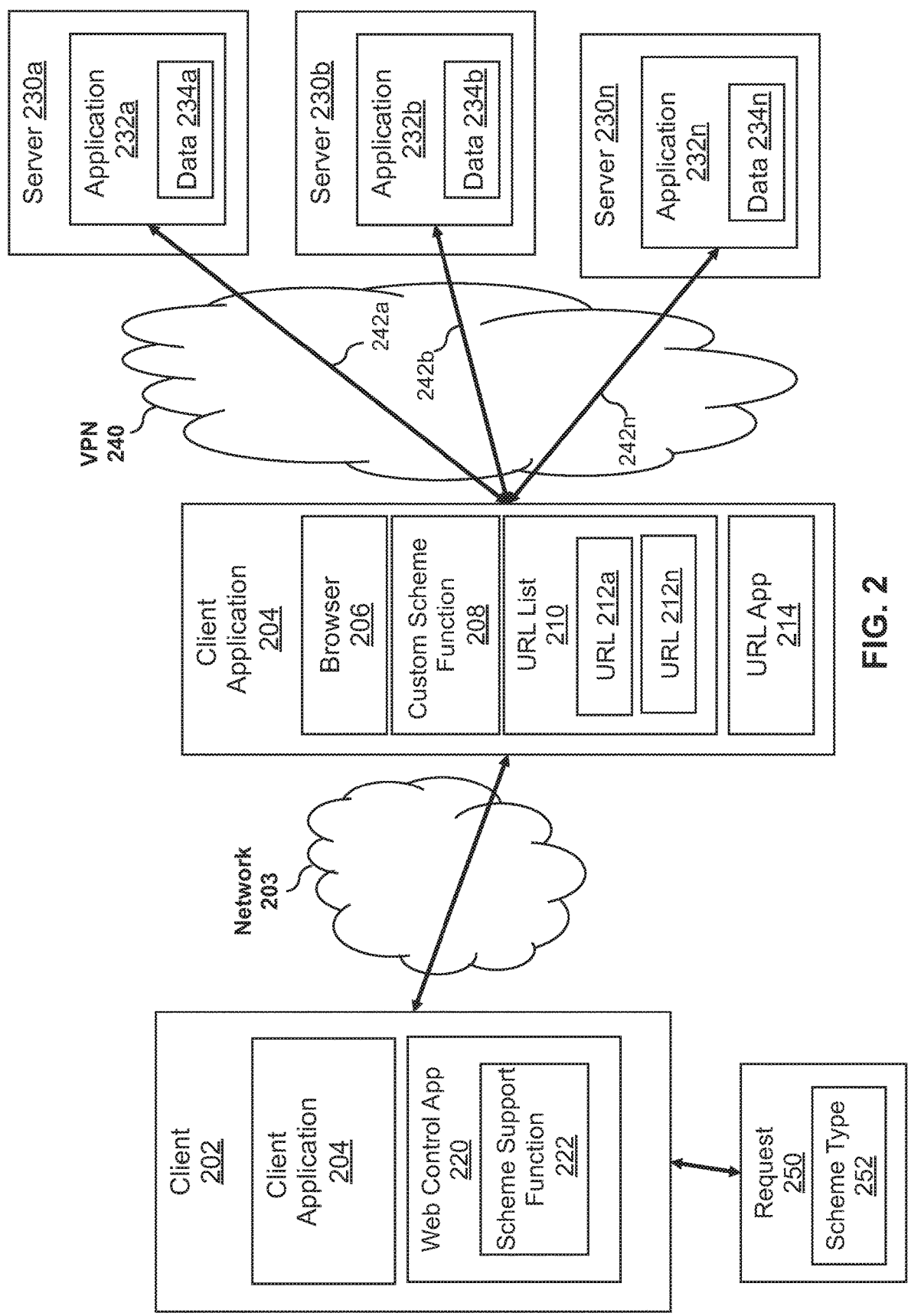
FIG. 2 is a block diagram of a system for web adaptation and hooking for virtual private network integration.

Referring to FIG. 2, depicted is a block diagram of one embodiment of a client application 204 executing on a client device 202 to provide web adaptation and hooking through a virtual private network 240 the client device can connect with to access one or more applications 232a-232n. For example, the client device 202 can include the client application 204 and a web control application 220. The web control application 220 can render and control content (e.g., web content) received from one or more of the applications 232a-232n through the client application 204 and VPN 240. The client application 204 can permit intercepting and hooking of different application requests from the web control application 220 to route the requests through the VPN 240 to the respective applications 232a-53n. The data received back in response to the routed requests can be provided to the web control application 220 for display on the client device 202.

The client device 202 can be an instance of any client device or computer device described herein. For example, the client device 202 can be the same as or substantially similar to computing device 101 of FIG. 1.

The client application 204 can include a browser 206, one or more custom scheme functions 208, a uniform resource locator (URL) listing 210, and a URL application 214. The client application 204 can include or be provided a device (e.g., intermediary device) or appliance disposed in a network 203 and/or VPN 240 between the client device 202 and servers 230a-230n. The client application 204 with the browser 206 (e.g., embedded browser (CEB)) can include a CEB. The browser 206 can include elements and functionalities of a web browser application or engine. The browser 206 can locally render one or more of application 1132a-1132n as a component or extension of the client application 204. For example, the browser 206 can render a SaaS/Web application inside the CEB which can provide the CEB with full visibility and control of at least one application session 232a-232n.

The custom scheme function 208 can include a function, protocol or hooking tool for rendering and/or providing content, application data and/or resources for the client device 202 through the client application 204. The custom scheme function 208 can include a custom scheme handler for handling and processing request of a particular scheme type (e.g., HTTP scheme, HTTPS schemes). For example, the custom scheme function 208 can be generated by the client application 204 to handle or process requests 250 having a particular scheme type 252. Thus, the custom scheme function 208 can include a function, protocol or hooking tool for rendering data for request corresponding to a scheme type (e.g., URL schemes, HTTP schemes, HTTPS schemes).

The URL listing 210 can include a plurality of URLs 212a-212n. The client application 204 can establish and maintain the URL listing 210. The URL listing 210 can include main frame URLs 212a-212n and/or secondary URLs 212a-212n. The URLs 212a-212n can correspond to addresses for one or more of servers 230a-230n, one or more of applications 232a-232n, and/or web content provided by servers 230a-230n or applications 232a-53n. The URL listing can include URLs 212a-212n accessed by the client device 202, the client application 204, the browser 206, the custom scheme function 208, and/or the web control application 220.

The URL application 214 can include an API executing on the client application 204 or client device 202. The URL application 214 can include an API or an object for establishing connections and/or communicating with one or more servers 230a-230n from client device 202 and/or client application 204. For example, in some embodiments, the URL application can generate a NSURLrequest and transmit the NSURLrequest through NSURLsession to communicate or download content from one or more servers 230a-230n. The client application 204 can include or provide a plurality of applications 214 and/or APIs 214. The URL application 214 may include any type or form of API detailed herein.

The URL application 214 can include a set of commands, functions, protocols, and/or objects for building software or to interact with internal or external systems (e.g., applications 232a-232n). For example, the URL application 214 can include programming instructions and/or standards for accessing a web-based application 232a-232n or web tool provided by servers 230a-230n.

The web control application 220 can include one or more scheme support functions 222. The web control application 220 can include application, web application, module, object or function for controlling, rendering or otherwise providing content for display to the client device 202. The web control application 220 can include an application program interface (API) for controlling and providing content retrieved from a server 230a-230n or application 232a-232n. For example, in some embodiments, the web control application can include or correspond to an object that displays interactive web content, such as but not limited to, WKWebView. The web control application 220 can include or correspond to an API of an operating system executing on the client device 202. For example, the web control application 220 can correspond to an API for providing or invoking a browser or web view within the client application 204 (or native application) executing on the client device 202 to control and provide web content, such as but not limited to, application data 234a-234n. The web control application 220 can control interactions and communications between the client application 204 executing on the client device 202 and an application 232a-232n hosted by a server 230a-230n.

The scheme support function 222 can include a function, protocol or hooking tool for rendering, loading or otherwise providing content or data of a particular scheme type (e.g., URL schemes, HTTP schemes, HTTPS schemes). For example, in some embodiments, the scheme support function 222 can include or correspond to a scheme handler, such as but not limited to, WKURLSchemeHandler for WKWebView. The scheme support function 222 can include a function or protocol for loading resources corresponding to URL schemes that the web control application 220 does not support or does not handle. The scheme support function 222 can hook requests for the particular scheme type from the web control application 220 and process the request having the particular scheme type for the web control application 220. For example, the scheme support function 222 can instruct an operating system of the client device 202 on how to handle a request of a particular scheme type (e.g., HTTP scheme, HTTPS scheme). The scheme support function 222 can handle custom URL scheme loading with the web control application 220.

The client device 202 can be connected to a plurality of servers 230a-230n through a virtual private network (VPN) 240. The VPN 240 can include one or more encrypted connections from the client device to one or more resources over a network 203 (e.g., internet, corporate network, private network). The VPN 240 can include a plurality of sessions 242a-242n (e.g., encrypted sessions, encrypted tunnels) established between the client device 202 and the servers 230a-230n and/or applications 232a-232n. For example, the VPN 240 can encrypt or include encrypted traffic transmitted between the client device 202 and the servers 230a-230n and/or applications 232a-232n through the encrypted sessions 242a-242n or encrypted tunnels 242a-242n. The servers 230a-230n may include an application delivery system for delivering a computing environment, application, and/or data files to client device 202. The servers 230a-230n can include remote severs or third party servers that host one or more applications 232a-232n.

The client application 204 can establish one or more of sessions 242a-242n to one or more of applications 232a-232n (e.g., network applications). For example, the client application 204 can establish one or more of sessions 242a-242n to one or more of applications 232a-232n through the browser 206 and the VPN 240. The sessions 242a-242n can include any type or form of a session as described herein. For example, sessions 242a-242n may include, but not limited to, an application session, an execution session, a desktop session, a hosted desktop session, a terminal services session, a browser session, a remote desktop session, a URL session and a remote application session. Sessions 242a-242n may include encrypted and/or secure sessions established between an application 232a-232n and the client device 202. For example, the sessions 242a-242n may include encrypted URL sessions and/or secure URL sessions established between at least one application 232 of the application 232a-232n and the client device 202 through the VPN 240. The encrypted URL sessions 242a-242n and/or secure URL sessions 242a-242 can include encrypted data or traffic transmitted between at least one application 232 of the application 232a-232n and the client device 202 through the VPN 240.

The applications 232a-232n may include applications (apps) that are served from and/or hosted on one or more servers, here servers 230a-230n (e.g., third part servers). The applications 232a-232n can include an application 232 hosted on at least one server 230 accessed by the client device 202 via a network 203 and/or VPN 240. The applications 232a-232n may include applications (apps) that are served from and/or hosted on one or more servers 230a-230n, such as but not limited to, web applications, software-as-a-service (SaaS) applications, and/or remote-hosted applications. The applications 232a-232n can include, but not limited to, a web application, a desktop application, a remote-hosted application, a virtual application, a software as a service (SaaS) application, a mobile application, an HDX application, a local application, a native application (e.g., native to the client device 202), and/or a device couple with the client device 202. The applications 232a-232n can include or provide data 234a-234n. For example, the data 234a-234n can include application data, information, content, web content, web pages generated by one or more of applications 232a-232n. In some embodiments, the data 234a-234n can include content provided by an application 232 during execution of the respective application 232.

The client device 202, client application 204 and/or web control application 220 can receive one or more requests 250. For example, the client device 202, client application 204 and/or web control application 220 can receive one or more requests 250 from a user of the client device 202. A request 250 can include a request for at least one application 232 of the applications 232a-232n and/or data 234a-234n corresponding to applications 232a-232n. In some embodiments, the web control application 220 can receive a request 250 from a user of the client device 202 through the client application 204 to execute one at least one application 232 of the applications 232a-232n. The request 250 can include a scheme type 252 or protocol corresponding to a scheme type 252. The scheme type 252 can include a protocol for facilitating communication between the client device 202, the client application 204, the web control application 220, servers 230a-230n, and/or applications 232a-232n over network 203 and/or VPN 240. For example, the scheme type 252 can include or correspond to a request-response protocol between two or more of client device 202, the client application 204, the web control application 220, servers 230a-230n, and/or applications 232a-232n over network 203 and/or VPN 240. The scheme type 252 can include, but not limited to, a URL schemes, a Hypertext Transfer Protocol (HTTP) scheme, and/or a HTTPS scheme. The scheme type 252 can include an HTTP request or an HTTPS request.

Network 203 may be a public network, such as a wide area network (WAN) or the Internet. In some embodiments, network 203 may be a private network such as a local area network (LAN) or a company Intranet. Network 203 may be a public network, such as a wide area network (WAN) or the Internet. Network 203 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, client 202 and one or more of servers 230a-230n may be on the same network 203. In some embodiments, client 202 and one or more of servers 230a-230n may be different networks 203.

Each of the above-mentioned elements or entities is implemented in hardware, or a combination of hardware and software, in one or more embodiments. Each component of the client application 204 may be implemented using hardware or a combination of hardware or software detailed above in connection with FIG. 1. For instance, each of these elements or entities can include any application, program, library, script, task, service, process or any type and form of executable instructions executing on hardware of a client device (e.g., the client device 202). The hardware includes circuitry such as one or more processors in one or more embodiments.

Figure 3A:
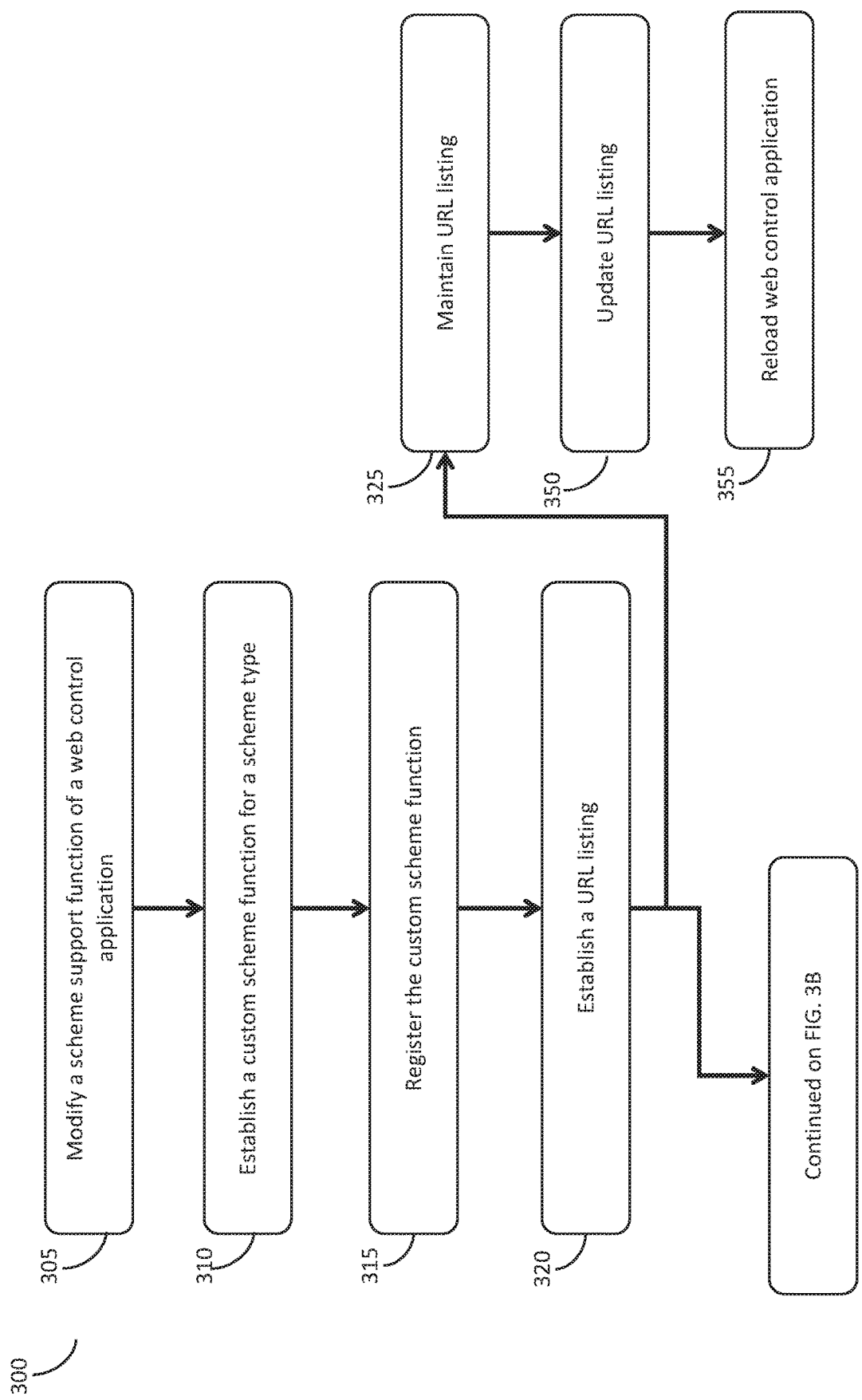

Referring now to FIGS. 3A-3B, depicted is a flow diagram of one embodiment of a method 300 for web control adaptation and hooking for virtual private network integration. The functionalities of the method 300 may be implemented using, or performed by, the components detailed herein in connection with FIGS. 1-2. In brief overview, a scheme support function of a web control application can be modified (305). A custom scheme function for a scheme type can be established (310). The custom scheme function can be registered (315). A URL listing can be established (320). The URL listing can be maintained (325). A request of the scheme type can be hooked (330). A URL session can be established through a VPN (335). The request can be transmitted through the VPN (340). Application data corresponding to the request can be received via the URL session and VPN (345). The URL listing can be updated (350). The web control application can be reloaded (355). The application data can be forwarded to the web control application (360). The application data can be rendered on a client device through the web control application (365).

Referring now to operation (305), and in some embodiments, a scheme support function 222 of a web control application 220 can be modified. For example, method 300 can include a client application 204, executing on a client device 202, modifying a scheme support function 222 of a web control application 220 to return a first value in response to a first scheme type 252. The first value can indicate that the web control application 222 does not support the first scheme type 252. The web control application 220 can include an application, web application, module, object or function for controlling, rendering or otherwise providing content for display to the client device 202. The web control application 220 can include an application program interface (API) for controlling and providing content retrieved from a web server 230 or third party server 230 to the client device 202. For example, the web control application 220 can correspond to an API for providing or invoking a browser 206 or web view within the client application (or native application) executing on the client device 202 to control and provide web content. The web control application 220 can control interactions and communications between the client application 204 executing on the client device 202 and a web page or third party server 230 hosting a respective web page. In some embodiments, the web control application 220 can embed content (e.g., web content, data 234) into an application 232 provided to the client device 202 through the client application 204. The scheme support function 222 can include a function, protocol or hooking tool for loading resources of a particular scheme type 252 (e.g., URL schemes, HTTP schemes, HTTPS schemes). For example, the scheme support function 222 can include a function or protocol for loading resources corresponding to URL schemes that the web control application 240 does not support or does not handle. The scheme support function 222 can hook requests 250 for the particular scheme type 252 from the web control application 220 and process the request 250 having the particular scheme type 252 for the web control application 220. For example, the scheme support function 222 can instruct an operating system on how to handle a request of a particular scheme type 252 (e.g., HTTP scheme, HTTPS scheme). The scheme support function 222 can handle custom URL scheme loading with the web control application 220.

In an embodiment, the client application 204 can modify at least one scheme support function 222 of the web control application 220 to indicate that the respective web control application 220 does not support a particular scheme type 252. The web control application 220 can include or utilize one or more scheme support functions 222 for rendering content to the client device 202. The scheme support functions 222 can support the web control application 220 in controlling, rendering, or otherwise providing content to the client application 204. The scheme support functions 222 can include classes or selectors of the web control application 220.

The client application 204 can change a functionality of the scheme support function 222 to return a value different from the value the respective scheme support function 222 may typically return in response to a request of the particular scheme type 252. For example, if the scheme support function 222 typically returns a "true" value in response to a request 250 of a first scheme type 252, the client application 204 can modify or change the functionality of the scheme support function 222 such that it returns a "false" value in response to the request of the first scheme type 252. In some embodiments, if the scheme support function 222 typically returns a "false" value in response to a request of a first scheme type 252, the client application 204 can modify or change the functionality of the scheme support function 222 such that it returns a "true" value in response to the request of the first scheme type 252. The functionality of the scheme support function 222 can be modified (e.g., "swizzled") to indicate that the web control application 220 does not support a particular scheme type 252.

For example, the web control application 220 may support or handle a plurality of scheme types 252, such as but not limited to, an "HTTP" scheme or "HTTPS" scheme. Therefore, responsive to receiving a request 250 having a first scheme type 252, the scheme support function 222 may return a value (e.g., true, yes) indicating that the web control application 220 supports the first scheme type 252. In embodiments described herein, the client application 204 can modify the scheme support function 222 such that in response to a request 250 for the first scheme type 252 (e.g., HTTP scheme, HTTPS scheme), the scheme support function 222 returns a first value (e.g., false, no) indicating that the web control application 220 does not support the first scheme type 252. Thus, the client application 204 can change (e.g., "swizzle") the response of the scheme support function 222 for different scheme types 252 to enable or permit hooking of requests 250 involving the different scheme types 252 and registering of the different scheme types 252 with the web control application 220.

Referring now to operation (310), and in some embodiments, a custom scheme function 208 for a scheme type 252 can be established. The client application 204 can generate a custom scheme function 208 for the first scheme type 252. The custom scheme function 208 can include a function, protocol or hooking tool for loading resources through a communication protocol corresponding to the first scheme type 252 (e.g., URL schemes, HTTPS schemes, HTTPS schemes). For example, the custom scheme function 208 can include a function or protocol for loading and/or rendering content of the first scheme type 252 for the client application 204 executing on the client device 202. The custom scheme function 208 can operate in place of the scheme support function 222 of the web control application 220. For example, the custom scheme function 208 can hook requests 250 for an application 232, the requests 250 of the first scheme type 252, from the web control application 220 and process the requests 250 having the first scheme type 252 for the web control application 220 and the client application 204. In some embodiment, the custom scheme function 208 can instruct the client application 204 or an operating system of the client device 202 on how to render content (e.g., data 234) from an application 232 using a protocol corresponding to the first scheme type 252 (e.g., HTTP scheme, HTTPS scheme). The custom scheme function 208 can provide custom scheme loading for the client application 204 for a particular scheme type 252.

In some embodiments, the client application 204 can establish a plurality of scheme functions 208. In an embodiment, each of the custom scheme functions 208 can correspond to and/or be configured to handle and/or process at least one scheme type 252. For example, the client application 204 can establish a custom scheme function 208 for particular a scheme type 252 or for a plurality of scheme types 252. The client application 204 can establish multiple custom scheme functions 208 for particular a scheme type 252 or for a plurality of scheme types 252. In some embodiments, the custom scheme function 208 can replace or override the scheme support function 222 of the web control application 220. For example, the custom scheme function 208 can perform hooking functionality that the scheme support function 222 of the web control application 220 may otherwise perform, however the custom scheme function 208 can be custom generated by the client application 204 to perform hooking functionality for requests 250 of one or more particular scheme types 252. The custom scheme function 208 can execute within environments (e.g., virtual private networks 240) that the web control application 220 and/or scheme support function 222 of the web control application 220 may not execute within or support. Thus, the custom scheme function 208 can provide hooking functionality in the environments (e.g., virtual private networks 240) that the scheme support function 222 of the web control application 220 may not support or execute within for a client device 202.

Referring now to operation (315), and in some embodiments, the custom scheme function 208 can be registered. Method 300 can include registering, by the client application 204, a custom scheme function 208 to handle the first scheme type 252 for the web control application 220. The client application 204 can register a plurality of custom scheme functions 208. For example, the client application 204 can register one or more custom scheme functions 208 with the web control application 220. The registration can configure the custom scheme function 208 to intercept or hook requests 250 for one or more applications 232a-232n of the first scheme type 252 received by the web control application 220 and/or the client application 204. In some embodiments, responsive to registering the custom scheme function 208, when a request 250 for an application 232 of the first scheme type 232 is received, the custom scheme function 208 can intercept or hook the request 250 for the application 232 of the first scheme type 252 and perform the processing corresponding to the respective request 250. In an embodiment, responsive to the registration, the web control application 220 can allow or permit the custom scheme function 208 to handle or process requests 250 of the first scheme type 252. For example, the web control application 220, responsive to registration, can ignore or forward the request 250 of the first scheme type 252 to the custom scheme function 208.

In some embodiments, the client application 204 can register one or more scheme types 252 with the web control application 220. For example, the client application 204 can register the first scheme type 252 with the web control application 220 such that, in response to receiving a request 250 for an application 232 of the first scheme type 252, the modified scheme support function 222 can return a first value indicating the web control application 220 does not support the first scheme type 252. Thus, the custom scheme function 208 can intercept or hook the request 250 for the application 232 of the first scheme type 252 and perform the processing corresponding to the respective request 250 instead of the web control application 220. In some embodiments, responsive to the registration, the web control application 220 can ignore or forward the request 250 of the first scheme type 252 to the custom scheme function 208 such that the custom scheme function 208 handles or processes requests 250 of the first scheme type 252.

Referring now to operation (320), and in some embodiments, a URL listing can be established. The client application 204 can establish a uniform resource locator (URL) listing 210. The URL listing 210 can include URLs 212a-212n accessed by the client device 202 or accessed by one or more applications executing on the client device 202. For example, the URL listing 210 can include, but not limited to, main frame URLs, secondary and/or re-directed URLs (e.g., re-directed URL corresponding to a main frame URL), URLs accessed by the client device 202, URLs accessed by the client application 204, and/or URLs accessed by the web control application 220.

In some embodiments, to establish the URL listing 210, the client application 204 can retrieve or extract URL data from a plurality of different sources, including but not limited to, the client device 202, the web control application 220, third party servers 230a-230n or remote servers 230a-230n. For example, the client application 204 can access browser cache data from the client device 202 or one or more native applications executing on the client device 202 to retrieve URL data. The client application 204 can access browser cache data from one or more applications executing on the client device 202 through the client application 204 to retrieve URL data. The client application 204 can retrieve URL data from different caches corresponding to an application 232 provided by the web control application 220 or the client application 204. For example, the client application 204 can retrieve URL data from a no-cache header field of an application 232 provided by the web control application 220 or the client application 204. The URL data included in the URL listing 210 can include URLs 212a-212n visited or accessed by the client device 202. The URL data included in the URL listing 210 can include URLs 212a-212n visited or accessed by the client device 202 through the client application 204. The URL data included in the URL listing 210 can include URLs 212a-212n visited or accessed by or otherwise handled by the custom scheme function 208 executing within the client application 204.

The client application 204 can retrieve URL data from one or more functions, selectors or objects of the web control application 220. For example, the client application 204 can retrieve URL data from a load request function of the web control application 220 used to load or navigate to a requested URL. The client application 220 can retrieve URL data from navigation function of the web control application 220 for routing a navigation action internally or to an external viewer via the web control application 220. The client application 204 can retrieve and/or track URL data from a re-direction function of the web control application 220 for instructing and/or re-directing the web control application 220 (or client application) to a re-directed web page requested by a remote server 230 or third party server 230.

Referring now to operation (325), and in some embodiments, the URL listing 210 can be maintained. For example, the client application 204 can maintain the URL listing 210. The client application 204 can maintain a URL listing 210 having a plurality of URLs 212a-212n accessed by the client device 202 through the custom scheme function 208. The client application 220 can maintain the URL listing 210 for the web control application 220 to redirect or point the web control application 220 to the correct or up to date URL 212 for a requested application 232 or web page. For example, the web control application 220 can access the URL listing 210 to identify a URL 212 for one or more applications 232a-232n. The web control application 220 can forward and/or transmit a request for data to the identified URL 212 corresponding to the one or more applications 232a-232n.

Referring now to operation (330), and in some embodiments, a request 250 of the scheme type 252 can be hooked. For example, the custom scheme function 208 can intercept or hook from the web control application 220, a first request 250 for a first application 232a of a plurality of applications 232a-232n. The first request 250 can include the first scheme type 252 and/or a protocol corresponding to the first scheme type 252. The first application 232a corresponding to a first URL 212a.

The custom scheme function 208 can intercept or hook the first request 250 that includes the first scheme type 252. For example, the modified scheme support function 222 of the web control application 220 can return a first value (e.g., false, no) in response to the first request 250 indicating that the web control application 220 does not support the first scheme type 252. In some embodiments, the web control application 220 can permit the custom scheme function 208 to handle the first request 250 of the first scheme type 252. For example, the web control application 220 can pass or forward the first request 250 of the first scheme type 252 to the custom scheme function 208. In an embodiment, requests 250 of a scheme type 252 not supported by the web control application 220 can be handled or processed by one or more custom scheme functions 208 generated to handle or process the respective scheme type 252. In some embodiments, the client application 204 can re-direct the first request 250 that includes the first scheme type 252 to the custom scheme function 208. For example, the client application 204 can pass or forward the first request 250 of the first scheme type 252 to the custom scheme function 208. In some embodiments, the custom scheme function 208 can hook a plurality of requests 250 from the web control application 220. In an embodiment, each of the plurality of requests 250 can include or be of the first scheme type 252. The plurality of requests 250 can include or be of one or more different scheme types 252.

In some embodiments, the client application 204 can receive a request 250 for a first application 232 of a first scheme type 222. For example, the request 250 can include the first scheme type 252 or include a protocol of the first scheme type 252. The first request 250 can identify a first application 232 of a plurality of applications 232a-232n. The first application 232 can be hosted and/or provided by a first server 230a of a plurality of servers 230a-230n (e.g., remote servers, third party servers). The client application 204 can identify that the first request 250 includes the first scheme type 252. In some embodiments, the web control application 220 can ignore the first request 250 of the first scheme type 252. In some embodiments, the web control application 220 can forward or transmit the first request 250 of the first scheme type 252 o the custom scheme function 208.

The client application 204 can re-direct the first request 250 to a virtual private network (VPN) 240. The client device 202 can connect to the VPN through the client application 204. In some embodiments, the client application can apply VPN logic to the first request 250 to access the requested first application 232a through the VPN 240. The VPN 240 can include one or more encrypted sessions 242a-242n and/or encrypted tunnels from the client device 202 to one or more servers 230a-230n, applications 232a-232n and/or resources over a network 203 (e.g., internet, corporate network, private network). For example, the VPN 240 can encrypt or include encrypted traffic transmitted between the client device 202 and the one or more servers 230a-230n, applications 232a-232n and/or resources through the encrypted sessions 242a-242n or encrypted tunnels.

Referring now to operation (335), and in some embodiments, a URL session 242 can be established through a VPN 240. The custom scheme function 208 can establish, using a URL application 214, a URL session 242 to the first application 232a through the VPN 240. The URL session 242 can connect the client device 202 and the first server 230a. In an embodiment, the custom scheme function 208 can establish one or more sessions 242a-242n with the one or more applications 232a-232n through the VPN 240 using the URL application 214. For example, the custom scheme function 208 can identify a URL application 214 that supports the first scheme type 252 and is configured to retrieve or download content (e.g., data 234) from an application 232 through the VPN 240. The custom scheme function 208 can execute the URL application 214 to establish the URL session 242 between the client device 202 and the first application 232a or the first server 230a hosting the first application 232a via the VPN 240. For example, the custom scheme function 208 can perform or make a network call or API call using the URL application 214 to establish the URL session 242 between the client device 202 and the first application 232a or the first server 230a hosting the first application 232a via the VPN 240.

In some embodiments, the client application 204 can establish a first session 242 with the first application 232a through the VPN 240. The first session 242 can include an encrypted session established between the client device 202 and the first application 232a or the first server 230a hosting the first application 232a via the VPN 240. The first session 242 can include a URL session established between the client device 202 and the first application 232a or the first server 230a hosting the first application 232a via the VPN 240. The URL session 242 can include an encrypted URL session established between the client device 202 and the first application 232a or the first server 230a hosting the first application 232a via the VPN 240. In some embodiments, the client application 202 can publish the first application 232a or publish application data 234a corresponding to the first application 232a on a server 230 remote or otherwise different from the client device 202. The client application 204 can publish the first application 232a or publish application data 234a corresponding to the first application 232a on a back end or remote server 230 that is different from the client device 202. The backend server 230 can include a database or database server 230 connected to the client device 202.

In some embodiments, the custom scheme function 208 can establish a plurality of URL sessions 242a-242n between the client device 202 and a plurality of servers 230a-230n through the VPN 240. For example, each of the plurality of URL sessions 242a-242n can correspond to at least one request 250 of the plurality of requests 250. Each of the plurality of URL sessions 242a-242n can connect the client device 202 to at least one server 230 of the plurality of servers 230a-230n.

Referring now to operation (340), and in some embodiments, the request 250 can be transmitted through the VPN 240. In some embodiments, the custom scheme function 208 can transmit, using a URL application 214, the first request 250 to the first URL 212a corresponding to the first application 232a through a VPN 240. The VPN 240 can be established between the client device 202 and the first server 230a hosting the first application 232a. The custom scheme function 208 can transmit the first request 250 of the first scheme type 252 to the first application 232a through the URL session 242 and the VPN 240. In some embodiments, the custom scheme function 208 can transmit the first request 250 of the first scheme type 252 to a URL 212 listed in the URL listing 210 maintained by the client application 204. For example, the custom scheme function 208 can identify at least one URL 212 corresponding to the first application 232a using the URL listing 210 and transmit the first request 250 to the identified URL 212. In some embodiments, the identified URL 212 can handle or process the first request 250.

In some embodiments, the URL application 214 can re-direct the first request 250 from the first URL 212a to a second URL 212b corresponding to the first application 232a through the VPN 240. In some embodiments, the custom scheme function 208 can re-direct the first request 250 from the first URL 212a to a second URL 212b corresponding to the first application 232a through the VPN 240. The second URL 212b can be hosted by the first server 230a of the plurality of servers 230a-230n or a second server 230b, different from the first server 230a, of the plurality of servers 230a-230n. In some embodiments, the request 250 can be re-directed or forwarded to a secondary or different URL 212 corresponding to the first application 232a. For example, the first application 232a may be available through a plurality of URLs 212a-212n (e.g., URL addresses) and the first request 250 can be redirected to at least one URL address 212 of the plurality of URL addresses 212a-212n (e.g., plurality of domains) corresponding to the first application 232a. Thus, the first request 250 can be redirected or forwarded from a main frame or primary URL 212 corresponding to the first application 232a to a secondary URL 212 corresponding to the first application 232a.

Referring now to operation (345), and in some embodiments, application data 234 corresponding to the request 250 can be received via the URL session 242 and VPN 240. The custom scheme function 208 can receive the data 234 corresponding to the first application 232a through a URL session 242 established between the client device 202 and the first server 230a via the VPN 240. In some embodiments, the custom scheme function 208 can receive, from the URL application 214, the data 234 corresponding to the first application 232a through a URL session 242 established between the client device 202 and the first server 230a via the VPN 240. In some embodiments, the custom scheme function 208 can receive application data 234 from the first application 232a through the URL session 242 established within the VPN 240. The custom scheme function 208 can receive application data 234 from the URL 212 listed in the URL listing 210 for the first application through the URL session established within the VPN. In some embodiments, the custom scheme function 208 can receive application data 234 from a re-directed URL 212 or source URL 212 corresponding to the first application 232a through the URL session 242 established within the VPN 240.

Referring now to operation (350), and in some embodiments, the URL listing 210 can be updated. The client application 204 can determine that the first request 250 has been redirected or forwarded to a secondary or different URL 212 that is not included in the URL listing 210. The client application 204 can determine that the source URL 212 that provided the application data 234 is not included in the URL listing 210. For example, the client application 204 can determine that the URL 212 that the first request 250 was transmitted to or the source URL 212 that provided the application data 234 is different from the URL 212 listed in the URL listing 210 and corresponding to the first application 232a. The client application 204 can compare the source URL 212 to the plurality of URLs 212a-212n included in the URL listing 210. If the source URL 212 is not included in the URL listing 210, the client application 204 can add the source URL 212 to the URL listing 210. For example, the client application 204 can add the second URL 212b to the URL listing 210 responsive to the re-direction. In some embodiments, the client application 204 can remove the previous URL 212 for the first application 232a or for at least one application 232 of the plurality of applications 232a-232n. In an embodiment, the client application 204 can remove the first URL 212a from the URL listing 210 responsive to the re-direction. For example, the client application 204 can determine the URL 212 that re-directed the first request 250 is included in the URL listing 210. The client application 204 can remove the URL 212 that re-directed the first request 250 to the source URL 212 from the URL listing 210.

Referring now to operation (355), and in some embodiments, the web control application 220 can be reloaded. The client application 204 can reload the web control application 220 responsive to updating the URL listing 210. The client application 204 can reload the web control application 220 such that the web control application 220 includes the updated URL listing 210 and can identify the source URL 212 for the first application 232a. For example, the client application 204 can update at least one URL 212 of the URL listing 210 responsive to a re-direction of the first request 250 from the first URL 212a. The client application can reload, reconnect to, restart or otherwise re-execute the web control application 220 response to updating the URL listing 210.

Referring now to operation (360), and in some embodiments, the application data 234 can be forwarded to the web control application. The custom scheme function 208 can forward to the web control application 220 for rendering on the client device 202, the data 234 corresponding to the first application 232a retrieved from by the URL application 214 through the VPN 240. In some embodiments, the custom scheme function 208 can provide the application data 234 corresponding to the first application 232a to the web control application 220.

Referring now to operation (365), and in some embodiments, the application data 234 can be rendered on a client device 202 through the web control application 220. In some embodiments, the web control application 220 can display, render or otherwise provide, on the client device 202, the data 234 corresponding to the first application 232a retrieved from by the URL application 214 through the VPN 240. For example, the web control application 220 can use or interact with different systems or resources (e.g., browser 206, user interface) of the client device 202 and/or client application 204 to provide data 234 corresponding to the requested first application 232a.

In some embodiments, the web control application 220 can execute, on the client device 202, the first application 232a using the data 234 corresponding to the first application 232a and retrieved from by the URL application 214 through the VPN 240 and one or more URL sessions 242a-242n. The web control application 220 can execute the first application 232a on the client device 202 or through the client application 204 for the client device 202. For example, the web control application 220 can execute the first application 232a on the client device 202 or through the client application 204 for the client device 202 using the application data 234. In some embodiments, the web control application 220 or client application 204 can install the first application 232a on the client device 202. For example, the web control application 220 or client application 204 can install the first application 232a on the client device 202 through one or more native applications or using one or more API's of the client application 204. The web control application 220 can execute the first application 232a on the client device 202 or through the client application 204 for the client device 202. In some embodiments, during execution of the first application 232a by the web control application 220 on the client device 202 or the client application 204, requests 250 for application data 234 corresponding to the first application 232a can be intercepted or hooked by the custom scheme function 208. The custom scheme function 208 can pass and transmit the requests 250 for application data 234 through the VPN 240 to provide VPN integration between the client device 202 and the web control application 220. For example, requests 250 for application data 234 corresponding to the first application 232a through the web control application 220 can be intercepted or hooked by the custom scheme function 208.

The web control application 220 can display the application data 234 corresponding to the first application 232a on the client device 202. For example, the web control application 220 can render or otherwise provide the application data 234 to the client device 202. The application data 234 can include, but not limited to, web content corresponding to the first application 232a. The web content can be provided to the custom scheme function 208 through the URL session 242 established using the URL API 214 and the VPN 240. In some embodiments, a custom URL scheme function can be generated by the client application 204. For example, the client application 204 can generate a custom URL scheme function to handle or process the requests of the first scheme type 252. In some embodiments, the custom URL scheme function can be generated instead of the custom scheme function 208. The custom URL scheme can modify or rewrite links corresponding to the first application 232a to point to or identify custom URLs 212 generated by the client application 204. For example, the custom URL scheme function can modify or rewrite links provided or received in the application data 234 from the first application 232a. The modified or rewritten links can connect to custom URLs 212 generated by the client application 204 to route the application data 234 through the VPN 240.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

What is claimed is:

1. A method for web control adaptation and hooking for virtual private network integration on a client device, the method comprising:
    (a) modifying, by a client application executing on a client device, a scheme support function of a web control application to return a first value in response to a first scheme type, the first value indicating that the web control application does not support the first scheme type;
    (b) registering, by the client application, a custom scheme function to handle the first scheme type for the web control application;
    (c) maintaining, by the client application, a uniform resource locator (URL) listing having a plurality of URLs accessed by the client device through the custom scheme function;
    (d) intercepting, by the custom scheme function from the web control application, a first request for a first application of a plurality of applications, the first request of the first scheme type, and the first application corresponding to a first URL;
    (e) transmitting, by the custom scheme function, the first request to the first URL corresponding to the first application through a virtual private network (VPN), the VPN established between the client device and the first server hosting the first application;
    (f) forwarding, by the custom scheme function to the web control application for rendering on the client device, the data corresponding to the first application retrieved through the VPN;
    (g) intercepting, by the custom scheme function, a plurality of requests from the web control application, each of the plurality of requests of the first scheme type; and
    (h) establishing, by the custom scheme function, a plurality of URL sessions between the client device and a plurality of servers through the VPN, each of the plurality of URL sessions corresponding to at least one request of the plurality of requests, and each of the plurality of URL sessions connecting the client device to at least one server of the plurality of servers.

2. The method of claim 1, further comprising re-directing, by the custom scheme function, the first request from the first URL to a second URL corresponding to the first application through the VPN, the second URL hosted by the first server of the plurality of servers.

3. The method of claim 2, further comprising adding, by the client application, the second URL to the URL listing responsive to the re-direction.

4. The method of claim 2, further comprising removing, by the client application, the first URL from the URL listing responsive to the re-direction.

5. The method of claim 1, comprising:
    updating, by the client application, at least one URL of the URL listing responsive to a re-direction of the first request from the first URL; and
    reloading, by the client application, the web control application responsive to updating the URL listing.

6. The method of claim 1, comprising displaying, by the web control application on the client device, the data corresponding to the first application retrieved from by the custom scheme function through the VPN.

7. The method of claim 1, comprising establishing, by the custom scheme function, a URL session to the first application through the VPN, the URL session connecting the client device and the first server.

8. The method of claim 1, comprising receiving, by the custom scheme function, the data corresponding to the first application through a URL session established between the client device and the first server via the VPN.

9. The method of claim 1, further comprising establishing, by the client application, a plurality of custom scheme functions, each of the custom scheme functions corresponding to at least one scheme type.

10. The method of claim 1, comprising executing, by the web control application on the client device, the first application using the data corresponding to the first application retrieved by the custom scheme function through the VPN.

11. A system for web control adaptation and hooking for virtual private network integration on a client device, the system comprising:
    a client application comprising one or more processors coupled to a memory, the client application executable on a client device, the client application configured to:
        modify a scheme support function of a web control application to return a first value in response to a first scheme type, the first value indicating that the web control application does not support the first scheme type;
        register a custom scheme function to handle the first scheme type for the web control application; and
        maintain a uniform resource locator (URL) listing having a plurality of URLs accessed by the client device through the custom scheme function; and
    the custom scheme function configured to:
        intercept, from the web control application, a first request for a first application of a plurality of applications, the first request of the first scheme type, and the first application corresponding to a first URL;

transmit the first request to the first URL corresponding to the first application through a virtual private network (VPN), the VPN established between the client device and the first server hosting the first application;

forward, to the web control application for rendering on the client device, the data corresponding to the first application retrieved through the VPN;

intercept a plurality of requests from the web application, each of the plurality of requests of the first scheme type; and establish a plurality of URL sessions between the client device and a plurality of servers through the VPN, each of the plurality of URL sessions corresponding to at least one request of the plurality of requests, and each of the plurality of URL sessions connecting the client device to at least one server of the plurality of servers.

12. The system of claim 11, wherein the custom scheme function is further configured to re-direct the first request from the first URL to a second URL corresponding to the first application through the VPN, the second URL hosted by the first server of the plurality of servers.

13. The system of claim 11, wherein the web control application is further configured to display, on the client device, the data corresponding to the first application retrieved from by the custom scheme function through the VPN.

14. The system of claim 11, wherein the client application is further configured to establish a plurality of custom scheme functions, each of the custom scheme functions corresponding to at least one scheme type.

15. The system of claim 11, wherein the client application is further configured to:

update at least one URL for the URL listing responsive to a re-direction of the first request from the first URL; and reload the web control application responsive to updating the URL listing.

16. The system of claim 11, wherein the web control application is further configured to execute, on the client device, the first application using the data corresponding to the first application retrieved by the custom scheme function through the VPN.

* * * * *